US007909449B2

(12) United States Patent
Sato et al.

(10) Patent No.: US 7,909,449 B2

(45) Date of Patent: Mar. 22, 2011

(54) INK JET RECORDING APPARATUS AND INK JET RECORDING METHOD

(75) Inventors: Shin-ichi Sato, Kawasaki (JP); Hideki Takayama, Fujisawa (JP); Yoshihisa Yamashita, Kawasaki (JP); Kenji Nishiguchi, Yokohama (JP); Aki Takano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 12/121,310

(22) Filed: May 15, 2008

(65) Prior Publication Data

US 2008/0292794 A1 Nov. 27, 2008

(30) Foreign Application Priority Data

May 23, 2007 (JP) ................................ 2007-136484

(51) Int. Cl.
*G01D 11/00* (2006.01)

(52) U.S. Cl. .......................... 347/100; 347/30; 106/31.6

(58) Field of Classification Search .................. 347/100, 347/30; 523/160; 106/31.13, 31.6
See application file for complete search history.

(56) References Cited

U.S. PATENT DOCUMENTS

| | | | | |
|---|---|---|---|---|
| 4,723,129 | A | 2/1988 | Endo, et al. | 346/1.1 |
| 4,740,796 | A | 4/1988 | Endo, et al. | 346/1.1 |
| 5,395,434 | A | 3/1995 | Tochihara, et al. | 106/22 R |
| 5,415,686 | A | 5/1995 | Kurabayashi, et al. | 106/26 R |
| 5,451,251 | A | 9/1995 | Mafune, et al. | 106/22 H |
| 5,482,545 | A | 1/1996 | Aoki, et al. | 106/22 K |
| 5,485,188 | A | 1/1996 | Tochihara, et al. | 347/100 |
| 5,835,116 | A | 11/1998 | Sato, et al. | 347/98 |
| 5,933,164 | A | 8/1999 | Sato, et al. | 347/43 |
| 6,003,987 | A | 12/1999 | Yamamoto, et al. | 347/100 |
| 6,027,210 | A | 2/2000 | Kurabayashi, et al. | 347/100 |
| 6,186,615 | B1 | 2/2001 | Sato, et al. | 347/43 |
| 6,203,604 | B1 | 3/2001 | Kashiwazaki, et al. | 106/31.5 |
| 6,238,045 | B1 | 5/2001 | Ono, et al. | 347/96 |
| 6,248,482 | B1 | 6/2001 | Kashiwazaki, et al. | 430/7 |
| 6,280,513 | B1 | 8/2001 | Osumi, et al. | 106/31.6 |
| 6,322,208 | B1 | 11/2001 | Sato, et al. | 347/105 |
| 6,332,919 | B2 | 12/2001 | Osumi, et al. | 106/31.6 |
| 6,511,534 | B1 | 1/2003 | Mishina, et al. | 106/31.33 |
| 6,572,692 | B1 | 6/2003 | Osumi, et al. | 106/31.6 |
| 6,698,876 | B2 | 3/2004 | Sato, et al. | 347/100 |

(Continued)

FOREIGN PATENT DOCUMENTS

JP 2000-198955 7/2000

(Continued)

*Primary Examiner* — Matthew Luu
*Assistant Examiner* — Rut Patel
(74) *Attorney, Agent, or Firm* — Fitzpatrick, Cella, Harper & Scinto

(57) ABSTRACT

An ink jet recording apparatus is provided with a plurality of inks and includes a unit configured to perform a recovery operation by suction of inks from a plurality of ink ejection portions using a suction cap, wherein the plurality of inks include an ink set including a combination of at least a first ink and a second ink, the first ink containing (i) a self-dispersion pigment having at least one hydrophilic group directly or through another atomic group bonded to the surface of the pigment, and (ii) ammonium ions, the second ink containing a pigment, a polymer having an acid value of 160 mg KOH/g or less, and alkali metal ions, and the suction cap used in the recovery operation is individually provided for each of the first ink and the second ink.

9 Claims, 7 Drawing Sheets

U.S. PATENT DOCUMENTS

| | | | | |
|---|---|---|---|---|
| 6,848,781 | B2 | 2/2005 | Ogino, et al. | 347/105 |
| 6,866,707 | B2 | 3/2005 | Kato | 106/31.6 |
| 6,874,881 | B2 | 4/2005 | Suzuki, et al. | 347/100 |
| 6,921,433 | B2 | 7/2005 | Kuribayashi, et al. | 106/499 |
| 6,964,700 | B2 | 11/2005 | Uji, et al. | 106/31.28 |
| 6,976,755 | B2 | 12/2005 | Sato, et al. | 347/100 |
| 7,029,109 | B2 | 4/2006 | Shirota, et al. | 347/100 |
| 7,055,943 | B2 | 6/2006 | Suzuki, et al. | 347/100 |
| 7,144,452 | B2 | 12/2006 | Takayama, et al. | 106/31.52 |
| 7,160,372 | B2 | 1/2007 | Yoshizawa, et al. | 106/31.47 |
| 7,198,664 | B2 | 4/2007 | Mafune, et al. | 106/31.28 |
| 7,198,665 | B2 | 4/2007 | Nakamura, et al. | 106/31.52 |
| 7,226,498 | B2 | 6/2007 | Yamashita, et al. | 106/31.5 |
| 7,241,332 | B2 | 7/2007 | Yoshizawa, et al. | 106/31.47 |
| 7,247,193 | B2 | 7/2007 | Sato | 106/31.27 |
| 7,247,194 | B2 | 7/2007 | Okamura, et al. | 106/31.47 |
| 7,247,196 | B2 | 7/2007 | Sato, et al. | 106/31.52 |
| 7,270,701 | B2 | 9/2007 | Jinnou, et al. | 106/31.47 |
| 7,285,159 | B2 | 10/2007 | Aikawa, et al. | 106/31.47 |
| 7,288,143 | B2 | 10/2007 | Aikawa, et al. | 106/31.58 |
| 7,291,361 | B2 | 11/2007 | Ogino, et al. | 427/258 |
| 7,294,184 | B2 | 11/2007 | Fujimoto, et al. | 106/31.47 |
| 7,297,197 | B2 | 11/2007 | Jinnou, et al. | 106/31.47 |
| 7,374,606 | B2 | 5/2008 | Sato, et al. | 106/31.27 |
| 7,378,459 | B2 | 5/2008 | Nishiguchi | 523/160 |
| 7,381,257 | B2 | 6/2008 | Takayama, et al. | 106/31.78 |
| 7,402,200 | B2 | 7/2008 | Imai, et al. | 106/31.27 |
| 2004/0212667 | A1 | 10/2004 | Nishiguchi | 347/96 |
| 2005/0041056 | A1 * | 2/2005 | Ide et al. | 347/24 |
| 2006/0103705 | A1 | 5/2006 | Yoshizawa, et al. | 347/100 |
| 2007/0052750 | A1 * | 3/2007 | Tokuno et al. | 347/30 |
| 2007/0287769 | A1 | 12/2007 | Nishiwaki, et al. | 523/160 |
| 2007/0287770 | A1 | 12/2007 | Nishiguchi, et al. | 523/160 |
| 2008/0139740 | A1 | 6/2008 | Nishiwaki, et al. | 524/556 |
| 2008/0146723 | A1 | 6/2008 | Nishiwaki, et al. | 524/500 |
| 2008/0292793 | A1 * | 11/2008 | Yamashita et al. | 427/256 |

FOREIGN PATENT DOCUMENTS

| | | |
|---|---|---|
| JP | 2001-089688 | 4/2001 |
| JP | 2003-213180 | 7/2003 |

* cited by examiner

INK JET RECORDING APPARATUS AND INK JET RECORDING METHOD

BACKGROUND OF THE INVENTION

1. Field of the Invention

The present invention relates to an ink jet recording apparatus and an ink jet recording method.

2. Description of the Related Art

As inks used in ink jet recording, generally, dye inks in which water-soluble dyes are dissolved in aqueous medium have been widely used. In recent years, pigment inks formed by dispersing pigments having higher water-fastness and higher lightfastness than dyes in aqueous medium have also been provided. Examples of the pigment inks include a pigment ink formed by dispersing a pigment using a dispersant in an aqueous medium, and a pigment ink having a self-dispersion pigment as a coloring material, the self-dispersion pigment having a hydrophilic group bonded to its surface to facilitate its dispersion, and the self-dispersion pigment being dispersed in an aqueous medium.

In exemplary proposals, a self-dispersion pigment is selected as a coloring material for a black ink used to record characters and drawings on plain paper because it allows achievement of high image density and excellent character quality (Japanese Patent Laid-Open Nos. 2000-198955 and 2001-089688).

Furthermore, as to a pigment ink used to form an image on a special recording medium, such as glossy paper having a coated surface, it has been considered to be effective from the viewpoint of abrasion resistance and glossiness to use a polymer-dispersion pigment as a coloring material, the polymer-dispersion pigment being dispersed using a polymer as a dispersant. Moreover, in recent years, in order to obtain high image quality regardless of the type of recording medium, proposals have been made in which a plurality of pigment inks of different pigment dispersion types are combined. For example, in one proposal, two types of ink, namely, a polymer-dispersion pigment ink in which a polymer-dispersion pigment is used as a coloring material, and a self-dispersion pigment ink in which a self-dispersion pigment is used as a coloring material, are provided in an ink jet recording apparatus to form an image (Japanese Patent Laid-Open No. 2003-213180).

SUMMARY OF THE INVENTION

Given the technology trends described above, and for the purpose of obtaining high image quality regardless of the type of recording medium, the present inventors conducted various studies using an ink jet recording apparatus in which two types of ink, namely, a self-dispersion pigment ink and a polymer-dispersion pigment ink, are provided. Specifically, the studies were conducted on image quality, water-fastness, and abrasion resistance of formed images, and also on recording durability in the recording apparatus, etc. In the studies, a self-dispersion pigment having $—COONH_4$ (which is excellent in water-fastness of formed images) as a hydrophilic group, the $—COONH_4$ being bonded to the surface of the pigment particles, was used as a coloring material for the self-dispersion pigment ink. Furthermore, a pigment dispersion in which a pigment was dispersed by an acrylic polymer was used as a coloring material for the polymer-dispersion pigment. The acrylic polymer was neutralized in an equal mol of potassium hydroxide and had an acid value of 160 mg KOH/g or less.

The present inventors carried out a test as described below in the process of conducting the various studies using the two types of ink described above. The test was a recording durability test in which a specific image was recorded on several hundred sheets using each ink. The image quality before and after the recording durability test was examined by recording a nozzle check pattern for confirming the state of each nozzle at each point and observing the images obtained. The specific image was a solid image formed on A4-sized plain paper with a recording density of 1,200 dpi·1,200 dpi at a recording duty of 15%.

In the test, when recording was performed with each ink being independently provided in the apparatus, even in the case where the image was recorded on several hundred sheets, image quality degradation was not observed. However, when the recording durability test was carried out with both the self-dispersion pigment ink and the polymer-dispersion pigment ink being provided in the ink jet recording apparatus, the occurrence of the following phenomenon was observed: the nozzle check pattern recorded using the self-dispersion pigment ink had deflections in the image. The deflections are a phenomenon caused by the displacement of the position where ink is applied to a recording medium (hereinafter referred to as the "deflection phenomenon"). In some cases, depending on the types of ink studied, the deflection phenomenon occurred even when a suction recovery operation was performed immediately after the two types of ink were provided in the ink jet recording apparatus.

Accordingly, the present inventors have conducted detailed studies to clarify factors that cause the deflection phenomenon. The inventors have determined that the deflection phenomenon occurs when a polymer incorporated in a polymer-dispersion pigment ink has an acid value of 160 mg KOH/g or less. The inventors also have determined that the deflection phenomenon is more marked when the three conditions described below are satisfied.

The first condition is that, in the recording apparatus, the distance between an ejection orifice row for ejecting the self-dispersion pigment ink and an ejection orifice row for ejecting the polymer-dispersion pigment ink is short. Specifically, the deflection phenomenon was observed when the self-dispersion pigment ink and the polymer-dispersion pigment ink were ejected from the adjacent ejection orifice rows, a suction recovery operation was subsequently performed, and then a nozzle check pattern was recorded.

The second condition is that the recording apparatus has a structure in which an ejection orifice region, including the ejection orifice rows for respectively ejecting the self-dispersion pigment ink and the polymer-dispersion pigment ink, is capped with a single cap.

The third condition is that there is a significant amount of polymer not adsorbed into the polymer-dispersion pigment ink (hereinafter referred to as "free polymer").

The inventors determined that the deflection phenomenon can occur when an image is formed by an ink jet recording apparatus from an ink containing a self-dispersion pigment and ammonium ions, and an ink containing a pigment, a polymer having a specific acid value, and alkali metal ions. Therefore, the present invention provides an ink jet recording apparatus and an ink jet recording method in which, regardless of the types of recording medium on which the two types of ink are intended to be used, satisfactory image quality can be obtained and, at the same time, the occurrence of the deflection phenomenon can be prevented.

According to an aspect of the present invention, an ink jet recording apparatus is provided with a plurality of inks and includes a unit configured to perform a recovery operation by suction of inks from a plurality of ink ejection portions using a suction cap, wherein the plurality of inks include an ink set including a combination of at least a first ink and a second ink, the first ink containing a self-dispersion pigment having at least one hydrophilic group directly or through another atomic group bonded to the surface of the pigment, and ammonium ions, the second ink containing a pigment, a polymer having an acid value of 160 mg KOH/g or less, and alkali metal ions, and the suction cap used in the recovery operation is individually provided for each of the first ink and the second ink.

According to another aspect of the present invention, an ink jet recording method is provided with a plurality of inks; and includes a process configured to perform a recovery operation by suction of inks from a plurality of ink ejection portions using a suction cap, wherein the plurality of inks constitute an ink set including a combination of at least a first ink and a second ink, the first ink containing a self-dispersion pigment having at least one hydrophilic group directly or through another atomic group bonded to the surface of the pigment particles, and ammonium ions, the second ink containing a pigment, a polymer having an acid value of 160 mm KOH/kg or less, and alkali metal ions, and the recovery operation is operated by using each of the suction cap provided for the ejection portions for the first ink and the second ink.

According to these aspects of the present invention, it is possible to provide an ink jet recording apparatus and an ink jet recording method in which the occurrence of a deflection phenomenon peculiar to the use of an ink set containing at least two inks can be prevented. Also, high-quality image formation with excellent abrasion resistance and glossiness can be performed regardless of the type of recording medium.

Further features of the present invention will become apparent from the following description of exemplary embodiments with reference to the attached drawings.

DESCRIPTION OF THE EMBODIMENTS

Figure 1:
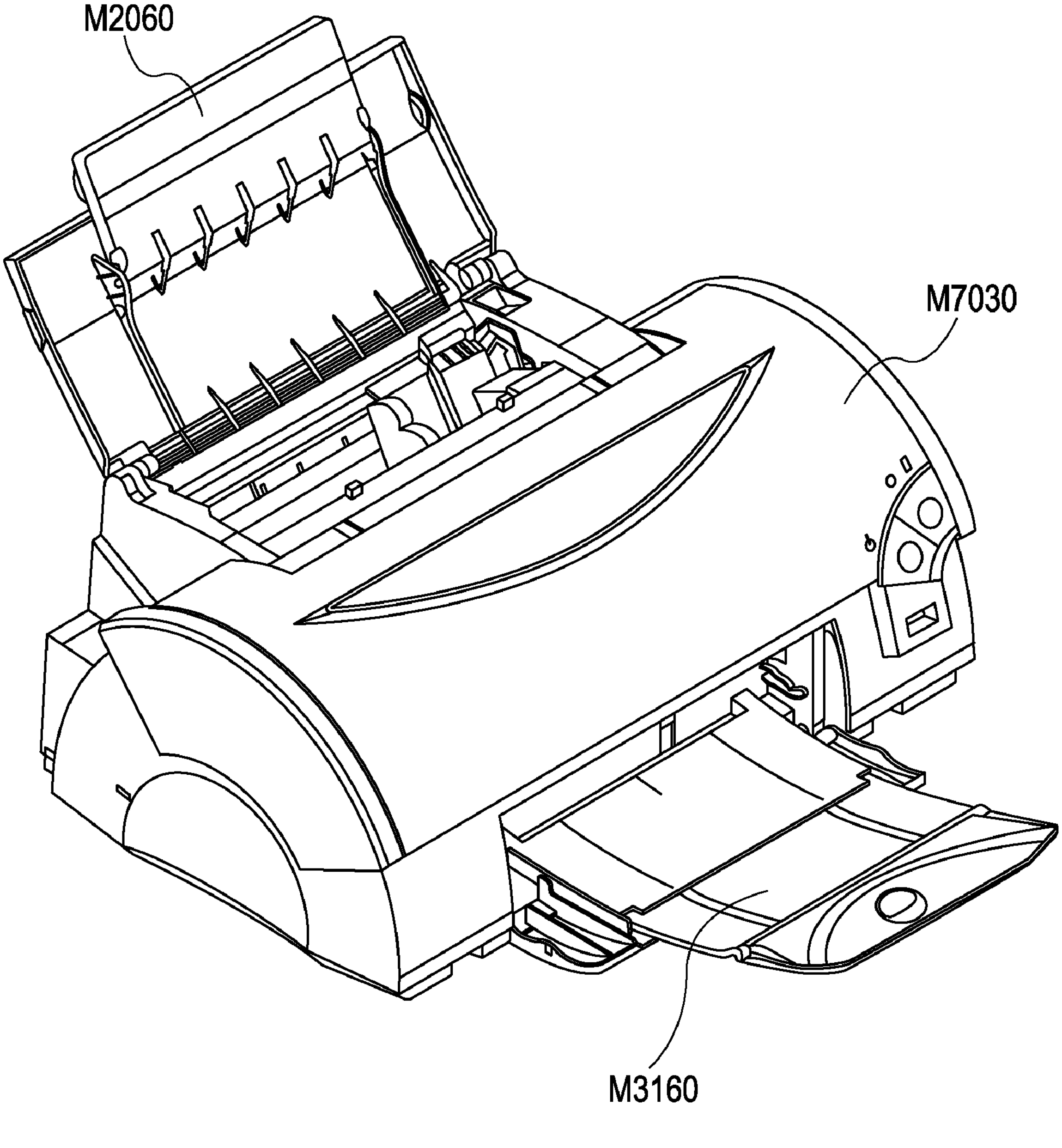
FIG. 1 is a perspective view of an ink jet recording apparatus according to an embodiment of the present invention.

The present invention will be described in detail below by way of embodiments. In the description below, the term "first ink" refers to an ink containing (i) a self-dispersion pigment having at least one hydrophilic group directly or through another atomic group bonded to the surface of the pigment and (ii) ammonium ions. Furthermore, the term "second ink" refers to an ink containing a pigment, a polymer having an acid value of 160 mg KOH/g or less, and alkali metal ions. Note that in the second ink, the pigment is at least partially dispersed by the polymer, and, in the description below, the expression "the second ink contains a polymer-dispersion pigment" may be used in some cases.

The present inventors have investigated the reason why a deflection phenomenon (which is not observed when a recording durability test is carried out with the first and the second inks independently provided in an ink jet recording apparatus) occurs when image recording is performed with both the first and second inks provided in an ink jet recording apparatus. The term "deflection phenomenon" refers to a phenomenon unique to a recording performed with the two types of ink both provided in ink jet recording apparatus. The deflections occur in an image formed by the first ink. To determine the cause of the deflection phenomenon, the present inventors have conducted various studies. As a result, the following has been found.

If the second ink contains an acrylic polymer, carboxylate ions can be present as a solubilizing group in the polymer. Alkali metal ions also can be present as counterions to the solubilizing group. The first ink and the second ink adhere to a face surface as fine ink droplets (mist) generated when the inks are ejected. The inks can also adhere as liquid droplets splashed back from the recording medium after being ejected from the recording head. Inks further can adhere due to the suction recovery operation of the recording head, or the like. The term "face surface" refers to a surface of the recording head on which ejection orifices are arranged, and the term "suction recovery operation of the recording head" refers to an operation of forcibly removing ink by suction from nozzles.

Upon adherence to the face surface, the first ink and second ink are mixed with each other. In some of the counterions, alkali metal ions are replaced by ammonium ions. Concurrent with the evaporation of water or the like, desorption of ammonia from ammonium ions then occurs, and some of the carboxylate ions are converted to carboxylic acid form. In the polymer, the number of the carboxylate ions converted to carboxylic acid form increases. Consequently, the solubility of the polymer decreases, and precipitation more readily occurs. Furthermore, resolubility significantly decreases compared to a polymer in which ammonium ions or alkali metal ions are bonded as counterions. Consequently, if the polymer with an increased amount of converted carboxylic acid adheres to and solidifies near ejection orifices, it becomes very difficult to remove the polymer by a usual cleaning operation. The term "usual cleaning operation" means an operation of removing attached substances by wiping the face surface of a recording head with a wiping member (wiper) composed of an elastic material, such as rubber. Since main ink droplets ejected from the ejection orifices can be pulled by the adhered and solidified polymer, the main ink droplets may be prevented from traveling in a straight path. Thus, the ion exchange process and the resulting decrease in solubility are the primary cause of the deflection phenomenon, which has been observed to be unpredictable.

Furthermore, during the studies, the present inventors have discovered that the deflection phenomenon in the recording durability test is not observed in the image formed with the second ink, and is observed only in the image formed with the first ink. The present inventors have conducted more detailed studies, and as a result, have concluded that the problem is strongly affected by the number of alkali metal ions and the number of ammonium ions when these two inks are brought into contact.

The first ink can attach in the vicinity of the ejection orifices for the second ink during the suction recovery operation. The only ammonium ions present in the vicinity of these ejection orifices are comprised of the ammonium ions contained in the attached first ink, and thus the total amount of ammonium ions is very small. Consequently, only a very small number of counterions of the polymer are replaced by ammonium ions, and therefore the solubility of the polymer is hardly affected.

On the other hand, in the vicinity of the ejection orifices for the first ink, the second ink can attach during the suction recovery operation. However, the amount of alkali metal ions in the attached second ink is very small. Consequently, when the first ink is ejected, the first ink is exposed to ammonium ions in an amount far exceeding the amount of alkali metal ions, and therefore many counterions of the polymer are easily replaced by ammonium ions. Consequently, along with the evaporation of water or the like, ammonia is eliminated, and the amount of the polymer converted to carboxylic acid form rapidly increases, resulting in precipitation of the polymer. Thus, the deflection phenomenon occurs. Furthermore, the present inventors have found that the deflection phenomenon occurs more markedly in the case in which the relationship $A/B \geqq 0.33$ is satisfied, where A is the ammonium ion concentration (mol/L) in the first ink, and B is the alkali metal ion concentration (mol/L) in the second ink.

The present inventors have also conducted studies to determine how to prevent the deflection phenomenon when forming images using an ink set including a combination of the first ink and the second ink, regardless of the contents and concentrations of the components in these inks. In general, the inventors have sought to discover how to prevent the deflection phenomenon from being caused.

The deflection phenomenon tends to occur more markedly when three particular conditions are present. The present inventors have conducted more detailed studies on the relationship between the deflection phenomenon and the following three conditions.

(1) The condition where, in the recording apparatus, the distance between an ejection orifice row for ejecting the self-dispersion pigment ink and an ejection orifice row for ejecting the polymer-dispersion pigment ink is short.

(2) The condition where the recording apparatus has a structure in which an ejection orifice region (ink ejection portion), which includes the ejection orifice rows for respectively ejecting the self-dispersion pigment ink and the polymer-dispersion pigment ink, is capped with a single cap.

(3) The condition where a large amount of polymer not adsorbed into the pigment is present in the second ink.

With respect to condition (3), decreasing the amount of polymer in the second ink can be unfavorable because such a decrease may negatively impact image quality, such as abrasion resistance and glossiness. With respect to condition (1), the present inventors have found that it is not feasible to overcome the deflection phenomenon solely by increasing the distance between the ejection orifice rows (for respectively ejecting the first and second inks) within the normally possible range when a suction recovery cap is shared.

With respect to condition (2), a technique in which separate suction caps are provided for a plurality of ejection orifice rows is generally used for an ink set that includes a combination of inks which react with each other, and it is not necessary to apply the technique to cases other than that. Specifically, for example, the technique is used when an anionic ink and a cationic ink are combined and used as an ink set, and when an ink set is used in which aggregation and precipitation of coloring materials and the like are caused by mixing or contact.

It is known, however, that even when the first and second inks of the present invention are mixed, precipitates and aggregates are not generated. Under normal circumstances, capping can be performed using a single cap for the ink set in which aggregation and precipitation are not caused. However, the present inventors have concluded that to overcome the problem of the deflection phenomenon, it is necessary to provide separate caps for an ink set including a plurality of inks which do not react with each other.

In the present invention, the use of the second ink is intended for obtaining an image excellent in abrasion resistance, glossiness, etc., even when the image is formed on a special recording medium, such as glossy paper having a coated surface. However, as described above, the relationship between the alkali metal ion concentration in the second ink and the ammonium ion concentration in the first ink causes the occurrence of the deflection phenomenon. In contrast, according to an embodiment of the present invention, it is possible to improve abrasion resistance and glossiness in images while preventing the deflection phenomenon regardless of the ammonium ion concentration in the first ink and the alkali metal ion concentration in the second ink.

The acid value of the polymer used in the second ink can be 80 mg KOH/g or more, and in particular, can be 90 mg KOH/g or more in view of the solubility of the polymer. On the other hand, the deflection phenomenon occurs when the acid value of the polymer contained in the second ink is 160 mg KOH/g or less. Consequently, the present invention is substantially directed to the problem of the deflection phenomenon generated when using the first ink in conjunction with the second ink containing a polymer with an acid value of 80 to 160 mg KOH/g.

<Components Constituting First and Second Inks>

The components constituting each of the first and second inks used in the present invention will be described below.

(Polymer Used in Second Ink)

The second ink contains a polymer having an acid value of 160 mg KOH/g or less. Any such polymer may be employed. As described above, the acid value of the polymer can be 80 mg KOH/g or more, and in particular, can be 90 mg KOH/g or more. The monomer components constituting the polymer, the ratio(s) of the individual monomer components, and the like are not particularly limited as long as the acid value of the polymer is in the range described above. The polymer used in the present invention can be formed by the polymerization of monomers, examples of which include aromatic monomers, acrylate ester monomers, methacrylate ester monomers, anionic group-containing monomers, polyethylene oxide group-containing monomers, and hydrocarbon monomers. Specific examples of the monomers that can be used include styrene, benzyl methacrylate, methyl acrylate, butyl acrylate, methoxytriethylene glycol acrylate, methoxypolyethylene glycol acrylate, and methoxypolyethylene glycol methacrylate. Other examples include acrylic acid and methacrylic acid.

The polymer used in the present invention can have a weight-average molecular weight of 3,000 to 10,000. If the weight-average molecular weight is less than 3,000, sufficient abrasion resistance may not be obtained in the resulting image. On the other hand, if the weight-average molecular weight exceeds 10,000, the solubility of the polymer decreases. Therefore, even if some of the counterions are replaced by ammonium ions, precipitation can easily occur, and the deflection phenomenon may occur more readily.

The content of the polymer (percent by mass) in the second ink can be 0.5% to 5.0% by mass, and in particular, can be 1.0% to 4.0% of the total mass of the ink. By setting the polymer content in the range of 0.5% to 5.0%, a sufficient amount of polymer can remain on the surface of the recording medium, improving the abrasion resistance of the resulting image. To further improve the abrasion resistance of the resulting image, the mass ratio of the polymer (percent by mass) to the pigment (percent by mass) in the second ink can be 0.50 to 10.0. That is, (polymer content/pigment content)= 0.50 to 10.0. Note that these values for the pigment content and the polymer content are relative to the total mass of the ink.

(Alkali Metal Ions Used in Second Ink)

The second ink used in the present invention must contain alkali metal ions because the present invention is directed to the prevention of the deflection phenomenon, which is believed to be caused by interaction between the ammonium ions of the first ink and alkali metal ions of the second ink. The alkali metal ions are incorporated in the ink, for example, by a base used as a neutralizing agent for the polymer, or by a pH adjuster or a salt, which may be used as needed. A neutralizing agent for the polymer can be an inorganic alkaline agent or the like, examples of which include hydroxides of alkali metals, such as sodium hydroxide, lithium hydroxide, and potassium hydroxide. Examples of salts include sulfates (e.g., sodium sulfate, lithium sulfate, and potassium sulfate) and benzoates (e.g., sodium benzoate, lithium benzoate, and potassium benzoate).

If the alkali metal ion concentration in the second ink is excessively low or excessively high, it may not be possible to provide sufficient preservation stability to the second ink. Consequently, the alkali metal ion concentration (mol/L) in the second ink can be adjusted to a range of 0.0076 to 0.15 mol/L. In particular, when the alkali metal ions in the second ink are derived from a neutralizing agent for the polymer, the alkali metal ion concentration in the second ink can be set in this range.

(Coloring Material)

The coloring material used in the first and second inks is a pigment, such as, for example, carbon black and organic pigments, as described below. The content of the pigment (percent by mass) in each ink can be 0.10% to 10.0% of the total mass of the ink.

[Carbon Black]

Examples of the carbon black suitable for use include furnace black, lamp black, acetylene black, and channel black, and specifically, the commercially available products described below. Note that the carbon black that can be used in the present invention is not limited to these examples, and any known carbon black can be used. Furthermore, fine particles of magnetic materials, such as magnetite and ferrite; titanium black; and others may be used. Examples of the commercially available products are: Raven 7000, 5750, 5250, 5000, 3500, 2000, 1500, 1250, 1200, 1190 ULTRA-II, 1170, and 1255 (manufactured by Columbia Chemical Company); Black Pearls L, Regal 400R, 330R, and 660R, Mogul L, Monarch 700, 800, 880, 900, 1000, 1100, 1300, and 1400, and Vulcan XC-72R (manufactured by Cabot Corporation); Color Black FW1, FW2, FW2V, FW18, FW200, S150, S160, and S170, Printex 35, U, V, 140U, and 140V, and Special Black 6, 5, 4A, and 4 (manufactured by Degussa Inc.); and No. 25, No. 33, No. 40, No. 47, No. 52, No. 900, No. 2300, MCF-88, MA600, MA7, MA8, and MA100 (manufactured by Mitsubishi Chemical Corporation).

[Organic Pigment]

Examples of the organic pigment that can be used include: water-insoluble azo pigments, such as toluidine red, toluidine marine, Hansa yellow, benzidine yellow, and pyrazolon red; water-soluble azo pigments, such as lithol red, Helio Bordeaux, Pigment Scarlet, and Permanent Red 2B; derivatives from vat dyes, such as alizarin, indantron and thioindigo maroon; phthalocyanine pigments, such as phthalocyanine blue and phthalocyanine green; quinacridone pigments, such as quinacridone red and quinacridone magenta; perylene pigments, such as perylene red and perylene scarlet; isoindolinone pigments, such as isoindolinone yellow and isoindolinone orange; imidazolone pigments, such as benzimidazolone yellow, benzimidazolone orange, and benzimidazolone red; pyranthrone pigments, such as pyranthrone red and pyranthrone orange; indigo pigments; condensed azo pigments; thioindigo pigments; flavanthrone yellow; acylamide yellow; quinophthalone yellow; nickel azo yellow; copper azomethine yellow; perinone orange; anthrone orange; dianthraquinonyl red; and dioxadine violet.

Examples of suitable organic pigments represented by color index (C.I.) numbers include: C.I. Pigment Yellow 12, 13, 14, 17, 20, 24, 74, 83, 86, 93, 109, 110, 117, 120, 125, 128, 137, 138, 147, 148, 151, 153, 154, 166, and 168; C.I. Pigment Orange 16, 36, 43, 51, 55, 59, and 61; C.I. Pigment Red 9, 48, 49, 52, 53, 57, 97, 122, 123, 149, 168, 175, 176, 177, 170, 192, 215, 216, 217, 220, 223, 224, 226, 227, 228, 238, and 240; C.I. Pigment Violet 19, 23, 29, 30, 37, 40, and 50; C.I. Pigment Blue 15, 15:3, 15:1, 15:4, 15:6, 22, 60, and 64; C.I. Pigment Green 7 and 36; and C.I. Pigment Brown 23, 25, and 26. Any known organic pigment other than the pigments described above can also be used.

(Pigment Used in First Ink)

The pigment used in the first ink must be a self-dispersion pigment having at least one hydrophilic group directly, or through another atomic group, bonded to its particle surface. The self-dispersion pigment can be dispersed in an aqueous medium constituting an ink without using a polymer (dispersant). A self-dispersion carbon black is one such pigment. One example of a self-dispersion carbon black is an anionic carbon black having an anionic group bonded to the surface of carbon black. Because the first ink used in the present invention must contain ammonium ions, ammonium ions may be incorporated into the ink due to the anionic group bonded to the surface of the pigment.

[Anionic Carbon Black]

An example of an anionic carbon black includes an anionic carbon black in which at least one anionic group, such as —COOM, —$SO_3M$, —$PO_3HM$, or —$PO_3M_2$, is bonded to the surface of the carbon black. In these formulas, M represents a hydrogen atom, ammonium, or organic ammonium. In particular, a carbon black in which —COOM or —$SO_3M$ is bonded (either directly or through another atomic group) to the surface and which is anionically charged can be used because of its high dispersibility in the ink. Examples of an organic ammonium represented by M include methylammonium, dimethylammonium, trimethylammonium, ethylammonium, diethylammonium, triethylammonium, methanolammonium, dimethanolammonium, and trimethanolammonium.

(Ammonium Ions Used in First Ink)

Ammonium or organic ammonium can be used as counterions to the anionic group (as represented by "M" in the above formulas). As described above, the first ink must contain ammonium ions in order for the deflection phenomenon to be prevented by the present invention. A self-dispersion pigment containing ammonium can be used as a counterion to the anionic group. By using such a self-dispersion pigment, counterions bonded to the anionic group can be dissociated and ammonium ions generated. As a result, the requirement that the first ink contain ammonium ions can be easily satisfied without adding another component to the ink. Examples of an atomic group include an alkylene group and an aromatic ring. Example alkylene groups include a methylene group, an ethylene group, and a propylene group. Example aromatic rings include a benzene ring and a naphthalene ring. If the ammonium ion concentration in the first ink is excessively low, sufficient preservation stability may not be obtained in the first ink. Therefore, the ammonium ion concentration (mol/L) in the first ink can be 0.0035 to 0.050 mol/L.

(Pigment Used in Second Ink)

The pigment used in the second ink is a polymer-dispersion pigment in which a pigment is dispersed by a polymer in an aqueous medium. As described above, an ink which contains a pigment and a polymer and in which the pigment is dispersed by at least a part of the polymer is defined as a polymer-dispersion pigment ink. Although the choice of polymer used as the dispersant is not particularly limited, a water-soluble polymer with an acid value of 160 mg KOH/g or less, such as the polymer described above, can be used. Furthermore, a neutralizing agent containing an alkali metal, such as a neutralizing agent described above, can be used.

(Compound Used in First Ink)

By further incorporating into the first ink of the present invention (A) a compound selected from nonionic surfactants and/or (B) a compound selected from the compound group described below, the advantageous effects of the present invention can be enhanced, as described below. Examples of the compound group (B) include polyethylene glycol with an average molecular weight of 600 to 2,000, a,w-alkanediol having 6 carbon atoms, and imidazolidinone derivatives. By using a first ink having such a composition, the problem of the present invention can be overcome regardless of the ammonium ion concentration in the second ink and the alkali metal ion concentration in the first ink. The reason for these advantageous effects is theorized as follows.

The present inventors have found that the deflection phenomenon, which is the problem of the present invention, results from the phenomenon caused by mixing of the first ink and the second ink, as described below. That is, in the counterions of the polymer, alkali metal ions are changed to ammonium ions, and then the polymer (a portion of which is converted to carboxylic acid by evaporation of ammonia) is precipitated in the vicinity of the ejection orifices, thus causing the deflection phenomenon.

The compounds exemplified as the component (B) are peculiar compounds that act on the hardly-soluble ammonium salt of the polymer and assist dissolution. Therefore, precipitation of the ammonium salt generated by the mixing of the two inks can be prevented. The inventors theorize that each of the compounds exemplified as the component (B) has a function of maintaining, by hydration, the solubility of the polymer in which the amount of ammonium ions is increased by ion exchange and electric repulsion is weakened. Furthermore, the component (A), i.e., the nonionic surfactant, has a function of dispersion-stabilizing the polymer in ammonium ion form and the polymer in carboxylic acid form in the initial stage of precipitation, and thus precipitates can be prevented from further growing and can be maintained soluble.

Thus, although the component (A) and the component (B) act and produce effects in different stages, as a result, precipitation in the vicinity of ejection orifices can be prevented. Consequently, the deflection phenomenon is believed to be effectively prevented. Furthermore, when the nonionic surfactant as the component (A) and the compound exemplified as the component (B) are together used for the first ink, a further favorable effect can be obtained in terms of prevention of the deflection phenomenon.

Examples of a nonionic surfactant that can be incorporated into the first ink include a polyoxyethylene monoalkyl ether, a polyoxyethylene alkylphenyl ether, and a block copolymer of polyoxyethylene and polyoxypropylene. Specific examples of the polyoxyethylene monoalkyl ether include polyoxyethylene monoalkyl ethers having an alkyl group with 12 to 22 carbon atoms (e.g., polyoxyethylene lauryl ether and polyoxyethylene cetyl ether). Specific examples of the polyoxyethylene alkylphenyl ethers include polyoxyethylene alkylphenyl ethers having an alkyl group with 9 to 18 carbon atoms (e.g., polyoxyethylene nonylphenyl ether). Specific examples of a block copolymer of polyoxyethylene and polyoxypropylene include a block copolymer in which the compositional ratio (by mass) of polyoxyethylene to polyoxypropylene is 1:5 to 5:1. Of course, as will be understood by those skilled in the relevant arts, the present invention is not limited to the specific surfactants enumerated above.

When a nonionic surfactant, i.e., the component (A), is incorporated in the first ink, the content thereof can be 0.05% to 5.0% by mass, and in particular, can be 0.05% to 1.25% of the total mass of the ink. If the content is less than 0.05% by mass, it may not be possible to obtain the effect of further preventing the deflection phenomenon by the use of the component (A). If the content exceeds 5.0% by mass, the viscosity of the ink may increase excessively so that the ink becomes unsuitable for use in ink jet recording.

Specific examples of a component (B) that can be incorporated in the first ink will now be provided. Examples of polyethylene glycol with an average molecular weight of 600 to 2,000 include polyethylene glycol with an average molecular weight of 600, 1,000, or 2,000. Examples of an a,w-alkanediol having 6 carbon atoms include 1,6-hexanediol, 2-methyl-1,5-pentanediol, and 3-methyl-1,5-pentanediol. Furthermore, examples of imidazolidinone derivatives include ethyleneurea and N,N'-dimethylimidazolidinone. Of course, as will be understood by those skilled in the relevant arts, the present invention is not limited to the specific components enumerated above.

When a compound corresponding to component (B) is incorporated in the first ink, the content thereof can be 2.0% to 20.0% by mass, and in particular, can be 2.0% to 10.0% of the total mass of the ink. If the content is less than 2.0% by mass, it may not be possible to obtain the effect of further preventing the deflection phenomenon by the use of the component (B). If the content exceeds 20.0% by mass, the viscosity of the ink may increase excessively so that the ink becomes unsuitable for use in ink jet recording.

The present inventors have determined that a small amount of nonionic surfactant (as the component (A)) prevents the deflection phenomenon more effectively than a similar amount of a compound corresponding to the component (B). Furthermore, as previously stated, the combination of a nonionic surfactant and a compound corresponding to component (B) also is effective. When these components are combined, the ink can be designed such that the mass ratio of the nonionic surfactant (A) to the compound corresponding to component (B) can be 0.005 to 0.5, i.e., 0.005 £ (A)/(B) £ 0.5. Note that the mass contents of component (A) and component (B) are relative to the total mass of the ink.

As described above, the deflection phenomenon is caused by ammonium ions replacing alkali metal ions in the counterions of the polymer, followed by the evaporation of the ammonium ions as ammonia. In the circumstance where the first ink contains ammonium ions (or a compound capable of generating ammonium ions), the deflection phenomenon may occur even when the first ink is used alone, i.e., not in conjunction with the second ink, due to the same mechanism as above. Therefore, the first ink desirably does not contain ammonium ions or a compound capable of generating ammonium ions (e.g., a polymer, an emulsion, or the like).

(Aqueous Medium)

The first and second inks used in the present invention can contain, in addition to the components described above, an aqueous medium which is a mixed solvent of water and a water-soluble organic solvent. As water, deionized water (ion-exchanged water) can be used, the content (percent by mass) of which can be 50.0% to 95.0% of the total mass of the ink. Furthermore, the content (percent by mass) of the water-soluble organic solvent can be 3.0% to 50.0% of the total mass of the ink, and such content may include a water-soluble organic solvent corresponding to component (B).

Example water-soluble organic solvents include: alkanediols, such as 1,3-butanediol, 1,5-pentanediol, and 1,2-hexanediol; glycol ethers, such as diethylene glycol monomethyl (or ethyl) ether, and triethylene glycol monoethyl (or butyl) ether; alkanols having 1 to 4 carbon atoms, such as ethanol, isopropanol, n-butanol, isobutanol, sec-butanol, and tert-butanol; carboxylic amides, such as N,N-dimethylformamide and N,N-dimethylacetamide; ketones or ketoalcohols, such as acetone, methyl ethyl ketone, and 2-methyl-2-hydroxypentan-4-on; cyclic ethers, such as tetrahydrofuran and dioxane; glycerol; alkylene glycols, such as ethylene glycol, diethylene glycol, triethylene glycol, tetraethylene glycol, 1,2- or 1,3-propylene glycol, and 1,2- or 1,4-butylene glycol; polyhydric alcohols, such as thiodiglycol and 1,2,6-hexanetriol; heterocycles, such as 2-pyrrolidone, N-methyl-2-pyrrolidone, and N-methylmorpholine; and sulfur-containing compounds, such as dimethyl sulfoxide.

(Other Components)

In order to retain moisture, the first and second inks used in the present invention may also contain a moisturizing solid component, such as urea, trimethylolpropane, or trimethylolethane. The content (percent by mass) of the moisturizing solid component in the ink can be 0.10% to 20.0%, and in particular, can be 3.0% to 10.0% of the total mass of the ink.

According to need, the first and second inks may further contain various additives such as a pH adjuster, a rust inhibitor, an antiseptic, a mildew proofing agent, an antioxidant, a reduction inhibitor, a neutralizing agent for water-soluble polymer, and a salt. For example, as the neutralizing agent for water-soluble polymer, a base may be used. Also, a sulfate (such as potassium sulfate or ammonium sulfate), a benzoate (such as ammonium benzoate), or the like may be used as the salt.

<Ink Jet Recording Apparatus>

An ink jet recording apparatus of the present invention is mounted with an ink set including a plurality of inks, and includes a unit configured to perform a recovery operation by suction of inks from a plurality of ink ejection portions using a suction cap. The ink jet recording apparatus includes an ink set with a combination of at least a first ink and a second ink, and the suction cap used in the recovery operation is individually provided for each of the ink ejection portions for the first and second inks. Other structures may be the same as those in known ink jet recording apparatuses. For example, an ink jet recording apparatus according to an embodiment of the present invention includes ink storage portions for storing the two inks and a recording head for ejecting the inks, as in any known apparatus. The effect of the present invention can be significantly exhibited in the case of an ink jet recording apparatus in which an ink is ejected by applying thermal energy to the ink from a recording head, and thus the present invention is particularly suitable to such a case.

A mechanism in an ink jet recording apparatus according to an embodiment of the present invention will now be described. The ink jet recording apparatus usually includes a paper feed unit, a paper transport unit, a carriage unit, a paper discharge unit, a cleaning unit, and an outer covering portion that protects these units and provides a decorative appearance. These units will be briefly described below.

Figure 2:
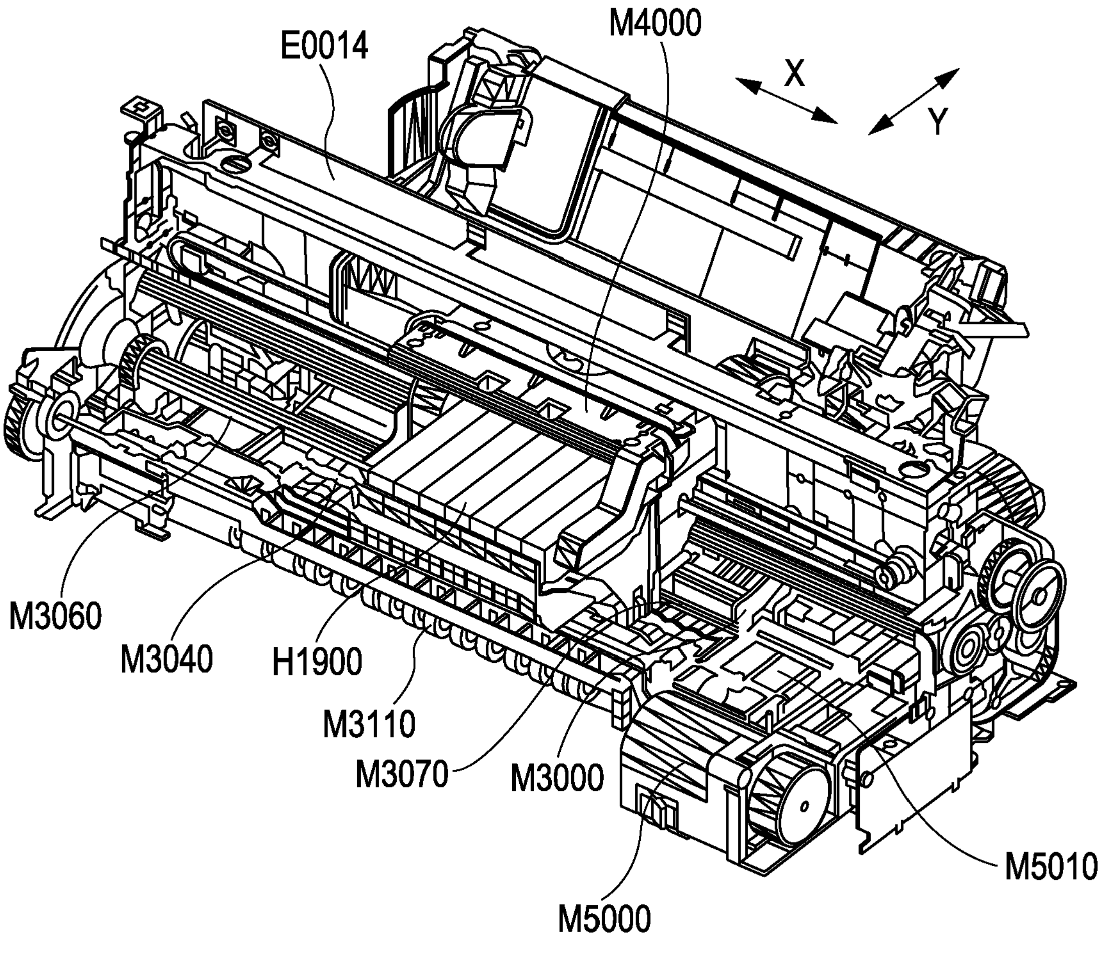
FIG. 2 is a perspective view showing an internal mechanism of the ink jet recording apparatus.
Figure 3:
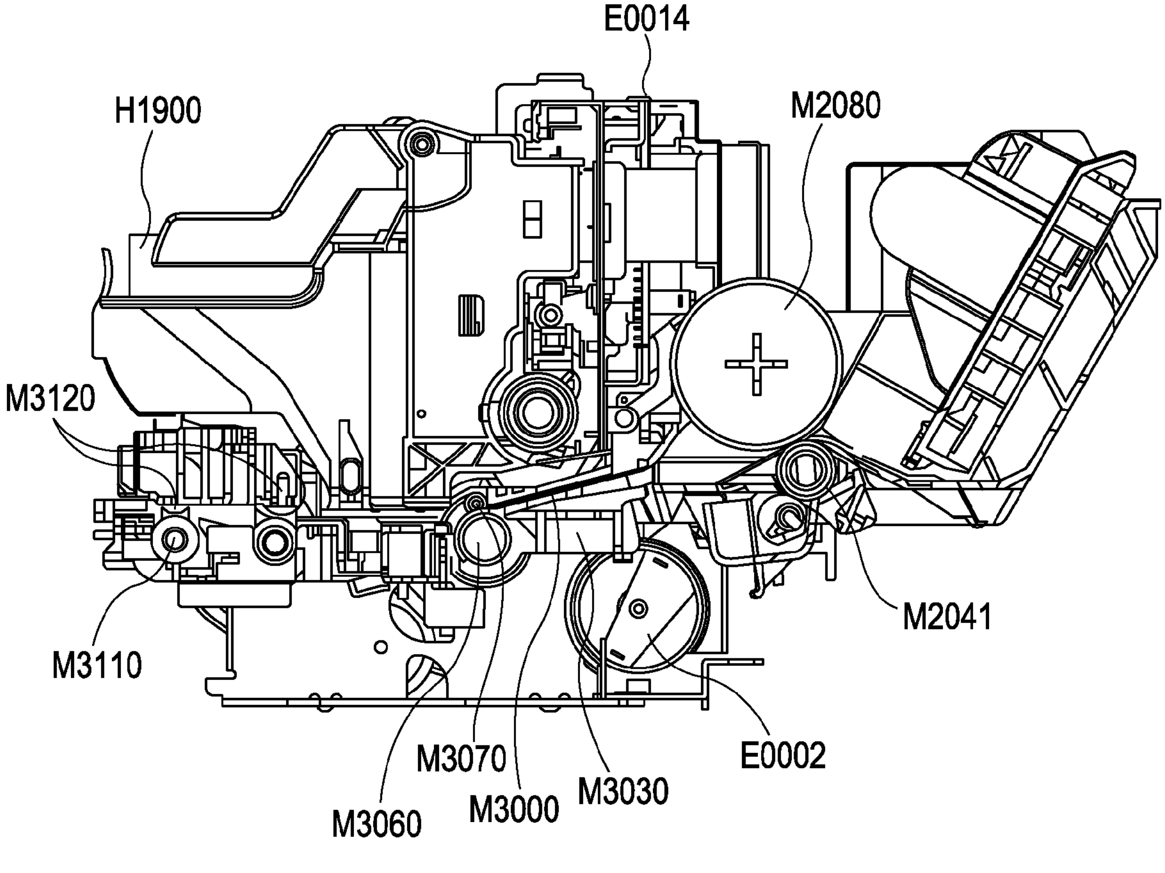
FIG. 3 is a cross-sectional view of the ink jet recording apparatus.

FIG. 1 is a perspective view of the ink jet recording apparatus. FIGS. 2 and 3 each show an internal mechanism of the ink jet recording apparatus. FIG. 2 is a perspective view from top right, and FIG. 3 is a cross-sectional side view.

In feeding paper, a predetermined number of sheets of a recording medium are fed from the paper feed unit including a paper tray M2060 to a nip portion including a paper feed roller M2080 and a separation roller M2041 (refer to FIGS. 1 and 3). The sheets are separated in the nip portion, and only the uppermost sheet is transported. The sheet transported to the paper transport unit is guided by a pinch roller holder M3000 and a paper guide flapper M3030 to a roller pair consisting of a transport roller M3060 and a pinch roller M3070. The roller pair consisting of the transport roller M3060 and the pinch roller M3070 is rotated by the driving of an LF motor E0002, and the recording medium is transported over a platen M3040 (refer to FIGS. 2 and 3).

In the image forming process, the carriage unit arranges a recording head H1001 (refer to FIG. 4) at a desired image forming position, and an ink is ejected to the recording medium in accordance with a signal from an electrical circuit board E0014 (refer to FIG. 2). A detailed structure of the recording head H1001 will be described later. By alternately repeating main scanning, in which the carriage M4000 (refer to FIG. 2) performs scanning in the vertical direction, and sub-scanning, in which the transport roller M3060 (refer to FIGS. 2 and 3) scans the recording medium in the horizontal direction while recording is being performed by the recording head H1001, an image is formed on the recording medium. Finally, the recording medium is held by a nip portion between a first paper discharge roller M3110 and a spur roller M3120 in the paper discharge unit (refer to FIG. 3) and discharged onto a paper discharge tray M3160 (refer to FIG. 1).

The cleaning unit cleans the recording head H1001. In the cleaning unit, when a pump M5000 (refer to FIG. 2) is activated with a cap M5010 (refer to FIG. 2) being brought into close contact with ejection orifices of the recording head H1001, ink and the like are removed from the recording head H1001 by suction. Furthermore, by sucking out residual ink from the cap M5010 in an open state, solidification of ink and other adverse effects can be prevented.

(Structure of Recording Head)

The structure of the head cartridge H1000 will now be described (refer to FIG. 4). The head cartridge H1000 includes the recording head H1001, a unit configured to mount an ink cartridge H1900, and a unit configured to supply ink from the ink cartridge H1900 to the recording head H1001. The head cartridge H1000 is detachably mounted on the carriage M4000 (refer to FIG. 2).

Figure 4:
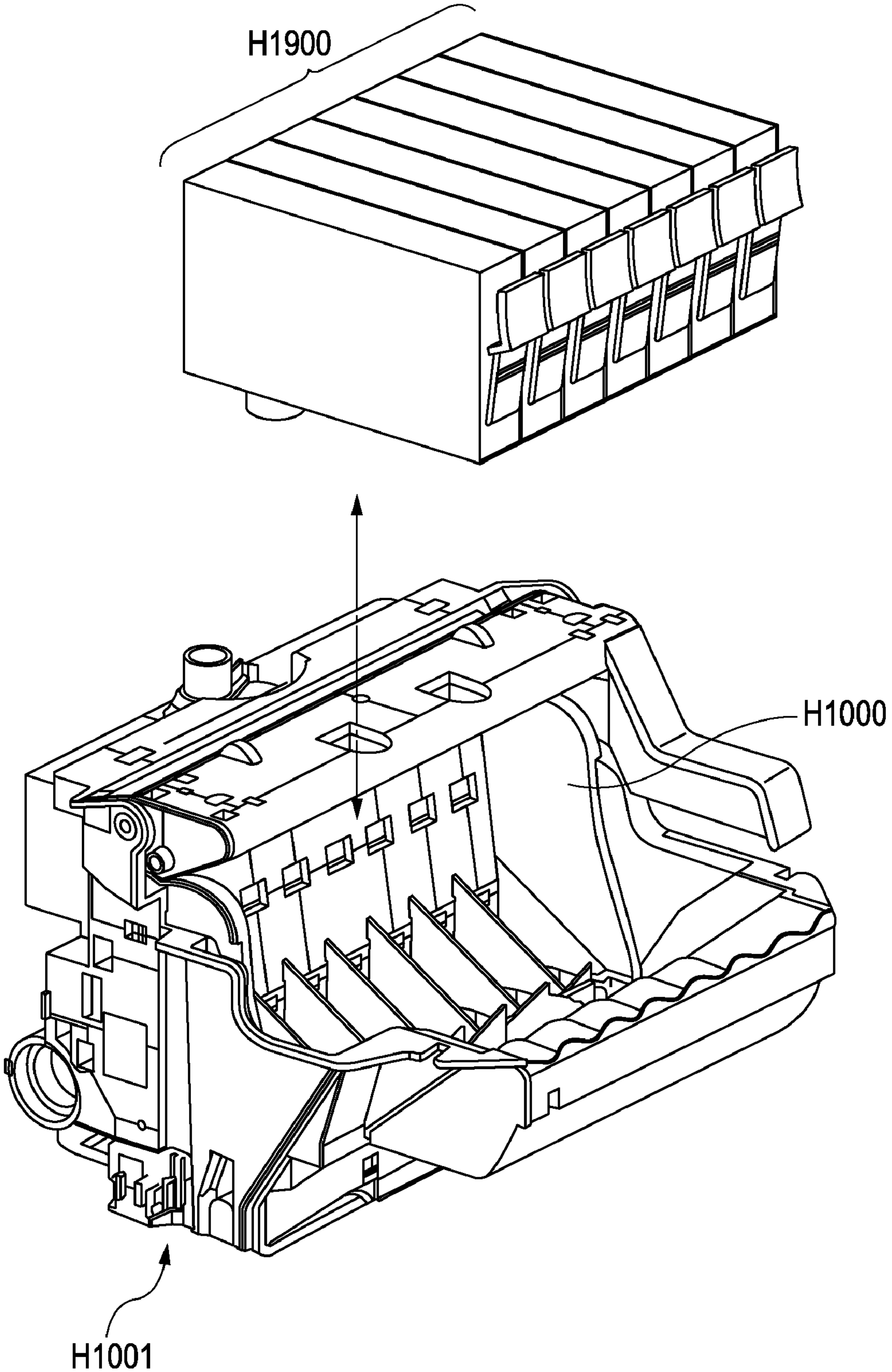
FIG. 4 is a perspective view showing a state in which an ink cartridge is mounted on a head cartridge.

FIG. 4 shows how the ink cartridge H1900 is mounted on the head cartridge H1000. The ink jet recording apparatus forms an image with, for example, seven inks. Consequently, an ink cartridge H1900 is provided independently for each of the seven colors. As shown in FIG. 4, each ink cartridge is detachably mounted on the head cartridge H1000. Note that mounting and dismounting of the ink cartridge H1900 can be performed with the head cartridge H1000 being mounted on the carriage M4000 (refer to FIG. 2).

Figure 5:
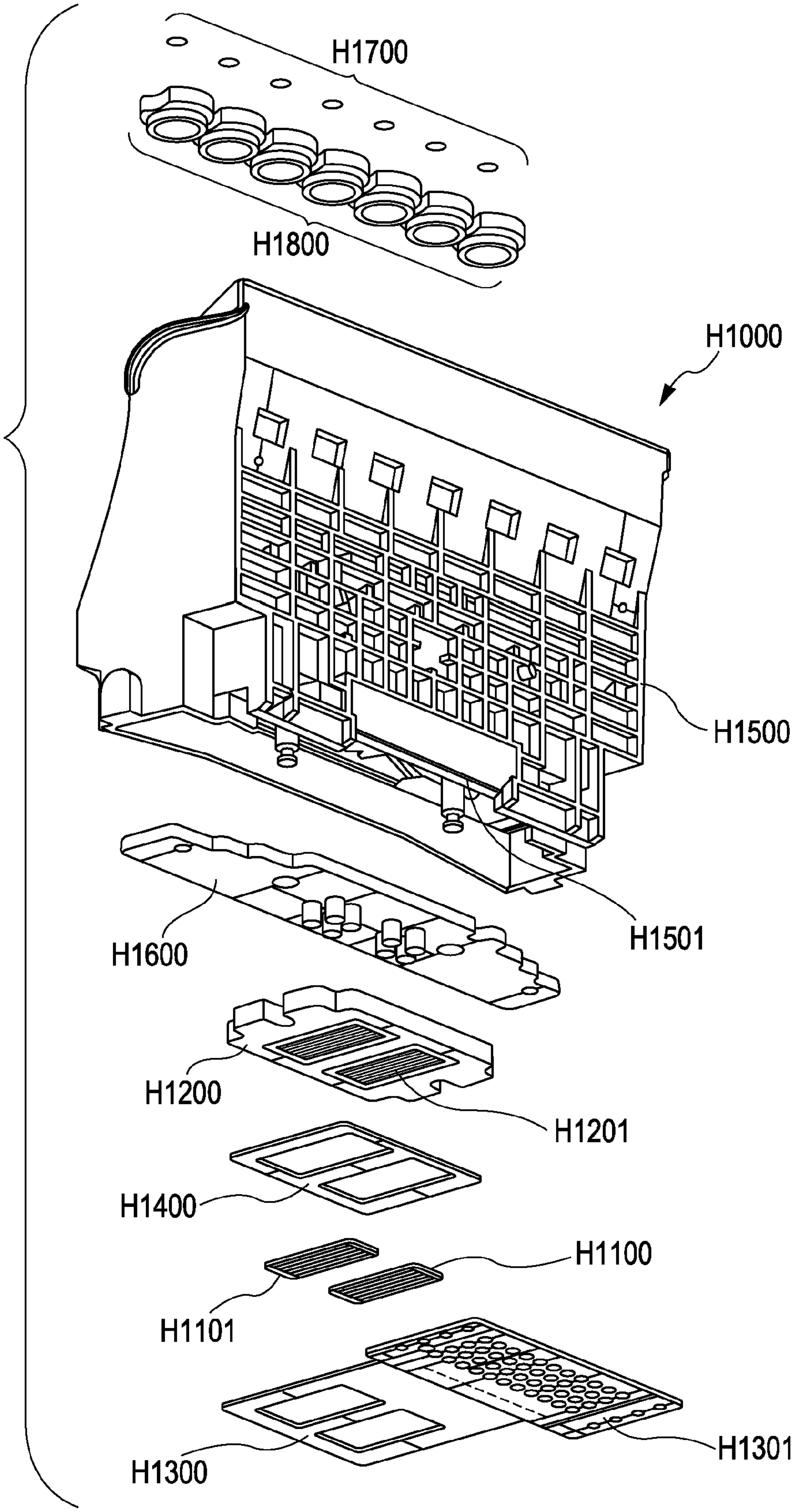
FIG. 5 is an exploded perspective view of the head cartridge.

FIG. 5 is an exploded perspective view of the head cartridge H1000. The head cartridge H1000 includes a recording element substrate, a plate, an electrical wiring board H1300, a cartridge holder H1500, a passage-forming member H1600, a filter H1700, a seal rubber H1800, and the like. The recording element substrate includes a first recording element substrate H1100 and a second recording element substrate H1101, and the plate includes a first plate H1200 and a second plate H1400.

Each of the first recording element substrate H1100 and the second recording element substrate H1101 is a Si substrate, one surface of which is provided with a plurality of recording elements (nozzles) for ejecting inks. The recording elements can be formed by photolithography. Electrical wires composed of aluminum or the like (for supplying electrical power to the individual recording elements) are formed by a deposition technique, and a plurality of ink passages corresponding to the individual recording elements also are formed by photolithography. Furthermore, ink supply ports for supplying inks to the plurality of ink passages are opened in the back surface of the recording element substrates.

Figure 6:
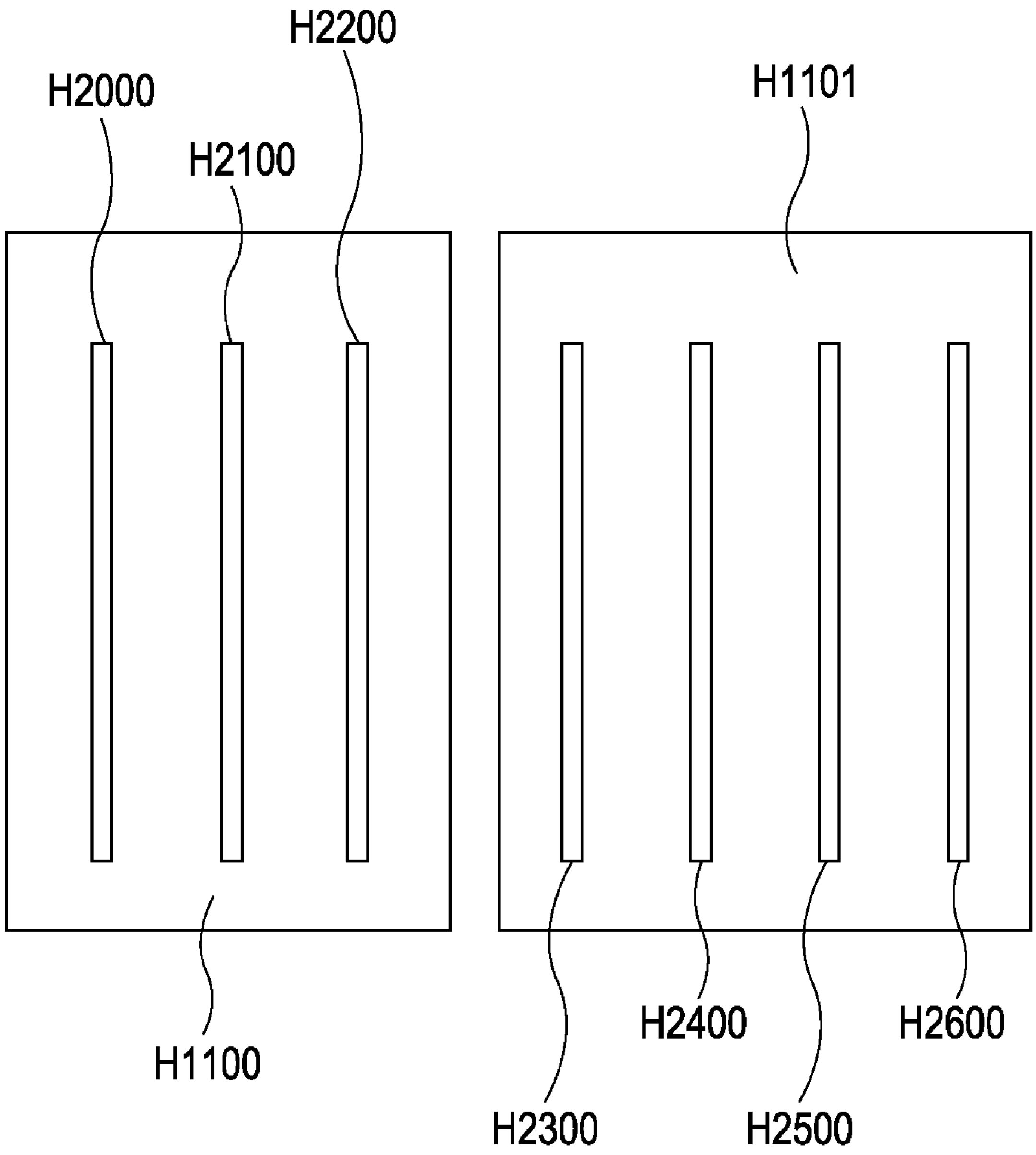
FIG. 6 is a front view of recording element substrates in the head cartridge.

FIG. 6 is an enlarged front view showing the structure of the first recording element substrate H1100 and the second recording element substrate H1101. Reference numerals H2000 to H2600 represent recording element rows (hereinafter also referred to as "ejection orifice rows") which supply different inks. The first recording element substrate H1100 has ejection orifice rows H2000 to H2200 for three colors. The second recording element substrate H1101 has ejection orifice rows H2300 to H2600 for four colors. Each ejection orifice row has 768 nozzles arrayed at intervals corresponding to 1,200 dpi (dots/inch) in the recording medium transport direction, and each ejection orifice ejects about 2 picoliters of ink. Each ejection orifice has an opening area of about 100 $mm^2$.

Referring to FIGS. 4 and 5, the first recording element substrate H1100 and the second recording element substrate H1101 are fixed by bonding to the first plate H1200, in which ink supply ports H1201 (for supplying inks to the first recording element substrate H1100 and the second recording element substrate H1101) are provided. Furthermore, the second plate H1400 is provided with openings and is fixed by bonding to the first plate H1200. The second plate H1400 holds the electrical wiring board H1300 such that the electrical wiring board H1300 is electrically connected to the first recording element substrate H1100 and the second recording element substrate H1101.

The electrical wiring board H1300 applies electric signals to the first recording element substrate H1100 and the second recording element substrate H1101 to cause the ejection of ink from their nozzles. The electrical wiring board H1300 has electrical wires corresponding to the first recording element substrate H1100 and the second recording element substrate H1101, and an external signal input terminal H1301 located at the ends of the wires to receive electrical signals from the ink jet recording apparatus. The external signal input terminal H1301 is positioned and fixed on the back side of the cartridge holder H1500.

The passage-forming member H1600 is fixed on the cartridge holder H1500 by, for example, ultrasonic fusion bonding. The cartridge holder H1500 holds the ink cartridge H1900 to form an ink passage H1501 communicating between the ink cartridge H1900 and the first plate H1200. The filter H1700 is provided at the end of the ink passage H1501 on the ink cartridge side that engages with the ink cartridge H1900 so that dust can be prevented from entering from the outside. Furthermore, the rubber seal H1800 is attached to the engaging portion with the ink cartridge H1900 so that inks can be prevented from evaporating from the engaging portion.

Furthermore, as described above, the cartridge holder unit and the recording head unit H1001 are joined together by bonding or the like to form the head cartridge H1000. The cartridge holder unit includes the tank holder H1500, the passage-forming member H1600, the filter H1700, and the rubber seal H1800. The recording head unit H1001 includes the first recording element substrate H1100, the second recording element substrate H1101, the first plate H1200, the electrical wiring board H1300, and the second plate H1400.

As an example of the recording head, a thermal ink jet recording head has been described, in which recording is performed using electrothermal conversion members (recording elements). The electrothermal conversion members generate thermal energy for causing film boiling in ink according to electrical signals. The structure and the principle disclosed in, for example, U.S. Pat. Nos. 4,723,129 and 4,740,796 can be favorably employed. The thermal ink jet recording head can be employed in the "On-Demand" type and "Continuous" type structures.

The thermal ink jet recording head is particularly effective when used in the "On-Demand" type structure. In the case of the "On-Demand" type structure, at least one driving signal (corresponding to recording information and providing a rapid temperature increase exceeding the nucleate boiling temperature) is applied to electrothermal conversion members arranged corresponding to liquid passages that hold ink. In this manner, the electrothermal conversion members are allowed to generate thermal energy, causing film boiling in ink. Consequently, a bubble can be formed in the ink proportional in size to the applied driving signal. By ejecting the ink through the ejection orifice by means of the growth and shrinkage of the bubble, at least one droplet is formed. When a pulsed driving signal is used, the growth and shrinkage of the bubble can be attained instantly and adequately to achieve ejection of the ink with particularly high response characteristics.

In addition to the thermal ink jet recording head described above, the present invention can also be applied to an ink jet recording apparatus using mechanical energy. Such an ink jet recording apparatus includes a substrate provided with a plurality of nozzles, a pressure-generating device composed of a piezoelectric material disposed opposite the nozzles and a conductive material, and an ink filling the surroundings of the pressure-generating device. The pressure-generating device is displaced by an applied voltage, resulting in the ejection of ink from the nozzles.

The ink jet recording apparatus is not limited to one in which the recording head and the ink cartridge are separately provided as described above. An ink jet recording apparatus in which a recording head and an ink cartridge are integrated also may be used. Furthermore, it may be possible to use a structure in which an ink cartridge detachably (or undetachably) integrated into a recording head is mounted in a carriage, or a structure in which an ink cartridge is provided on a fixed portion of an ink jet recording apparatus, and an ink is supplied to a recording head through an ink-supplying member, such as a tube.

When a structure for applying a suitable negative pressure to a recording head is provided on an ink cartridge, it may be possible to use a structure in which an absorbent is arranged in an ink storage portion of the ink cartridge, or a structure provided with a flexible storage bag and a spring portion for applying an urging force to increase the internal volume of the bag. Furthermore, the ink jet recording apparatus may employ a serial recording method as described above, or may be a line printer obtained by aligning recording elements over the range corresponding to the entire width of a recording medium.

(Suction Cap System)

Figure 7:
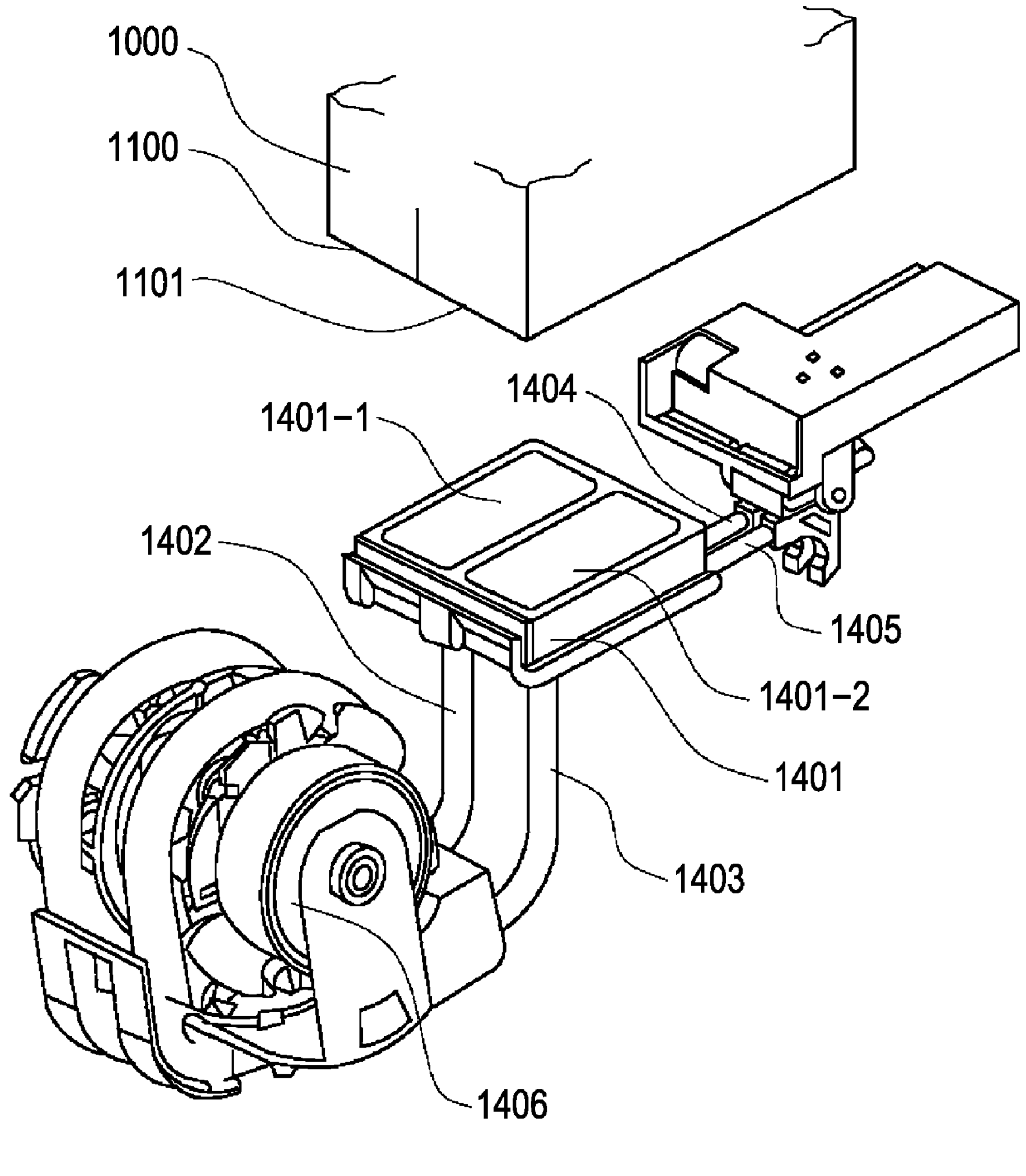
FIG. 7 is a perspective view showing a maintenance system of the ink jet recording apparatus.

FIG. 7 is a perspective view showing a maintenance system of the ink jet recording apparatus of the present invention. A suction cap member 1401 includes a cap A (1401-1) and a cap B (1401-2) which are designed so as to respectively cap the recording head A (1100) and the recording head B (1101) constituting the recording head 1100. The suction cap member 1401 is designed so as to be abutted or pressed against the surface of the recording head having nozzles. Each of the cap A (1401-1) and the cap B (1401-2) of the suction cap member 1401 has an ink absorbent provided inside. Furthermore, the cap A (1401-1) and the cap B (1401-2) of the cap member 1401 have air open valves 1404 and 1405, respectively. Furthermore, ink discharge tubes 1402 and 1403 are independently connected to the cap A (1401-1) and the cap B (1401-2). If suction pumps are independently arranged for the ink discharge tubes 1402 and 1403, the maintenance system becomes bulky, resulting in increases in the size and cost of the ink jet recording apparatus. Consequently, as shown in FIG. 7, it is desirable to have one suction pump 1406 arranged for the two ink discharge tubes 1402 and 1403. Thus, in the example shown in FIG. 7, the caps 1401-1 and 1401-2 of the suction cap member 1401, the air open valves 1404 and 1405, and the ink discharge tubes 1402 and 1403 are independently arranged so as to correspond to the recording heads. On the other hand, the suction pump 1406 is commonly used.

In the ink jet recording apparatus of the present invention, the recovery operation in which ink is sucked out of the ink ejection portion (hereinafter referred to as the "suction recovery operation") is carried out as described below. In the suction recovery operation, only an air open valve arranged for a cap of the suction cap member corresponding to the recording head subjected to suction recovery is closed. An air open valve arranged for a cap of the suction cap member not subjected to suction recovery is opened. In such a manner, the recording head subjected to the suction recovery operation can be selected from a plurality of recording heads.

The following series of operations is referred to as the suction recovery operation. First, the surface of the recording head 1100 provided with ejection orifices for ejecting ink is capped with the cap corresponding to the recording head 1100 out of the two caps arranged in the suction cap member 1401. Then, when the air open valve (also referred to as an air communication valve) corresponding to the recording head 1100 is closed, the suction pump 1406 is rotated. Thereby, the ink in the cap corresponding to the suction cap member 1401 or the ink in the nozzles of the recording head 1100 is sucked out. By performing the suction operation, the ejection state of the ink from the recording head 1100 can be maintained satisfactory. As a result, the function of the recording head is recovered.

In the ink jet recording apparatus of the present invention, with respect to the recording head 1101, the suction recovery operation is performed in the same manner in which capping is performed with the cap corresponding to the recording head 1101 out of the two caps provided in the suction cap member 1401. The suction cap member 1401 must have a structure in which capping can be performed independently for the recording head of the first ink and the recording head of the second ink, as shown in FIG. 7. However, with respect to inks other than the inks constituting the ink set, it may be possible to use a suction cap having a structure in which a plurality of recording heads can be simultaneously capped. Furthermore, in the suction recovery operation described above, by changing the rotational amount or number of rotations, the negative pressure applied to the recording head can be changed, and the amount of ink to be recovered can be changed. Also, it is possible to change the amount of ink to be recovered by changing the operation time of the suction pump.

<Ink Jet Recording Method>

The ink jet recording method of the present invention is one that using a plurality of inks; and having a process configured to perform a recovery operation by suction of inks from a plurality of ink ejection portions using a suction cap. The method is characterized by that, the plurality of inks constitute an ink set including a combination of at least the first and second inks, and also the recovery operation is operated by using each of the suction cap provided for the ejection portions for the first ink and the second ink. The method can be carried out by, for example, the ink jet recording apparatus having above-mentioned constitution.

EXAMPLES

The present invention will be described below in more detail on the basis of Examples and Comparative Examples, but it is to be understood that the invention is not limited thereto insofar as it does not exceed the gist of the present invention. In the following description, "part" or "%" is relative to mass, unless otherwise noted.

<Preparation of Pigment Dispersion and Polymer Aqueous Solution>

(Preparation of Self-Dispersion Pigment and Pigment Dispersion A)

A solution was obtained by dissolving 5 g of concentrated hydrochloric acid in 5.5 g of water. The solution was cooled to 5° C. and 1.5 g of 4-aminophthalic acid was added. The solution was stirred while placed in an ice bath such that the temperature of the solution was maintained at 10° C. or less. A solution of 1.8 g of sodium nitrite dissolved in 9 g of water at 5° C. was added thereto. The resulting solution was further stirred for 15 minutes, and then 6 g of carbon black with a specific surface area of 220 $m^2/g$ and a DBP oil absorption of 105 mL/100 g was added while stirring, with stirring further continued for 15 minutes. The resulting slurry was filtered through a filter paper (Standard Filter Paper No. 2, manufactured by Advantec Co., Ltd.), and then the filtered particles were thoroughly washed with water, followed by drying un an oven at 110° C. The resulting self-dispersion carbon black was treated with hydrochloric acid, and then neutralization was performed using aqueous ammonia, resulting in a preparation of self-dispersion carbon black A. A dispersion then was prepared by dispersing the self-dispersion carbon black A in water such that the pigment concentration was 10.0%. By this process, a pigment dispersion A was obtained.

In the pigment dispersion A, the self-dispersion carbon black A (in which the $—C_6H_3—(COONH_4)_2$ group was introduced to the surface of carbon black particles) was dispersed in water. The concentration of ammonium ions in the pigment dispersion A was measured using an ion meter (Orion 290A+, manufactured by Thermo Electron Corporation) connected to an ammonium ion electrode. The measurement result was 1,500 ppm.

(Preparation of Polymer-Dispersion Pigment and Pigment Dispersion B)

The carbon black (10 parts) used in the preparation of the pigment dispersion A, a block copolymer of styrene/methoxytriethylene glycol methacrylate/acrylic acid (2.5 parts) as a dispersant, and ion-exchanged water (87.5 parts) were mixed, with dispersion performed for three hours using a paint shaker. The block copolymer had an acid value of 160 mg KOH/g, was neutralized in an equal mol of potassium hydroxide, and had a weight-average molecular weight of 10,000.

After the dispersion treatment, coarse particles were removed by centrifugation, and pressure-filtering was performed through a microfilter having a pore size of 3.0 mm (manufactured by FUJIFILM Corporation). By this process, a polymer-dispersion carbon black B was prepared. The pigment concentration was adjusted to 10.0% with water to obtain a pigment dispersion B with a pigment concentration of 10.0% and a polymer concentration of 2.5%.

(Preparation of Polymer Aqueous Solution C)

A random copolymer of styrene/n-butyl acrylate/acrylic acid with an acid value of 160 mg KOH/g and a weight-average molecular weight of 7,500 was neutralized in an equal mol of potassium hydroxide. The polymer concentration was then adjusted to 10.0% with water to obtain a polymer aqueous solution C.

<Preparation of Ink>

Using the pigment dispersion A prepared as described above, BK1-1 to BK1-30 (corresponding to the first ink containing the self-dispersion pigment and ammonium ions) were prepared. Using the pigment dispersion B and the polymer aqueous solution C prepared as described above, BK2 (corresponding to the second ink containing the polymer and alkali metal ions) was prepared. The components shown in Tables 1 through 4 below were mixed and thoroughly stirred, and then pressure-filtering was performed through a microfilter having a pore size of 2.5 mm (manufactured by PALL Corp). Thereby, the individual inks were obtained. The ammonium ion concentration in BK1-1 to BK1-30 was 0.037 mol/L, and the alkali metal ion concentration in BK2-1 and BK2-2 was 0.11 mol/L.

In Tables 1 through 4, the numerical values (400, 600, 1,000, 2,000, and 4,000) attached to polyethylene glycol indicates their average molecular weights. Polyoxyethylene cetyl ether is a nonionic surfactant and corresponds to polyoxyethylene with 20 repeating units. Pluronic F68 is a nonionic surfactant that is a block copolymer of polyoxyethylene and polyoxypropylene manufactured by Adeka Corp., and the compositional ratio (by mass) of polyoxyethylene to polyoxypropylene is 4:1. Acetylenol E100 is a nonionic surfactant that is a polyoxyethylene adduct of acetylene glycol manufactured by Kawaken Fine Chemicals Co., Ltd.

TABLE 1

Composition of first ink (Compositions shown in %)

| | BK1 ink | | | | | | | | | |
|---|---|---|---|---|---|---|---|---|---|---|
| | 1 | 2 | 3 | 4 | 5 | 6 | 7 | 8 | 9 | 10 |
| Pigment dispersion A | 40.00 | 40.00 | 40.00 | 40.00 | 40.00 | 40.00 | 40.00 | 40.00 | 40.00 | 40.00 |
| Pigment dispersion B | | | | | | | | | | |
| Polymer aqueous solution C | | | | | | | | | | |
| Glycerol | 10.00 | 10.00 | 12.00 | 10.00 | 10.00 | 10.00 | 10.00 | 10.00 | 12.00 | 12.00 |
| Trimethylolpropane | 5.00 | | | | | | | | | |
| Polyoxyethylene cetyl ether | | | 0.50 | | | | | | | |
| Polyoxyethylene nonylphenyl ether | | | | | | | | | 0.50 | |
| Pluronic F68 | | | | | | | | | | 0.50 |
| Acetylenol E100 | | | | | | | | | | |
| Sodium dodecylbenzene sulfonate | | | | | | | | | | |
| Polyethylene glycol 600 | | | | | | | | | | |
| Polyethylene glycol 1,000 | | | | | | | | 2.50 | | |
| Polyethylene glycol 2,000 | | | | | | | | | | |
| Polyethylene glycol 400 | | | | | | | | | | |
| Polyethylene glycol 4,000 | | | | | | | | | | |
| Ethyleneurea | | 7.00 | | | | | | | | |
| N,N'-dimethylimidazolidinone | | | | 7.00 | | | | | | |
| Urea | | | | | | | | | | |
| 2-Pyrrolidone | | | | | | | | | | |
| 1,6-Hexanediol | | | | | 7.00 | | | | | |
| 3-Methyl-1,5-pentanediol | | | | | | 7.00 | | | | |
| 2-Methyl-1,5-pentanediol | | | | | | | 7.00 | | | |
| 1,2-Hexanediol | 1.00 | 1.00 | 1.00 | 1.00 | 1.00 | 1.00 | 1.00 | 1.00 | 1.00 | 1.00 |
| 1,4-Butanediol | | | | | | | | | | |
| 1,5-Pentanediol | | | | | | | | | | |
| 1,7-Heptanediol | | | | | | | | | | |
| 1,2,6-Hexanetriol | | | | | | | | | | |
| Ion-exchanged water | 44.00 | 42.00 | 46.50 | 42.00 | 42.00 | 42.00 | 42.00 | 46.50 | 46.50 | 46.50 |
| Content of component (A) [%] | 0.00 | 0.00 | 0.50 | 0.00 | 0.00 | 0.00 | 0.00 | 0.00 | 0.50 | 0.50 |
| Content of component (B) [%] | 0.00 | 7.00 | 0.00 | 7.00 | 7.00 | 7.00 | 7.00 | 2.50 | 0.00 | 0.00 |
| (A)/(B) | — | 0.00 | — | 0.00 | 0.00 | 0.00 | 0.00 | 0.00 | — | — |

TABLE 2

Composition of first ink (compositions shown in %)

| | BK1 ink | | | | | | | | | |
|---|---|---|---|---|---|---|---|---|---|---|
| | 11 | 12 | 13 | 14 | 15 | 16 | 17 | 18 | 19 | 20 |
| Pigment dispersion A | 40.00 | 40.00 | 40.00 | 40.00 | 40.00 | 40.00 | 40.00 | 40.00 | 40.00 | 40.00 |
| Pigment dispersion B | | | | | | | | | | |
| Polymer aqueous solution C | | | | | | | | | | |
| Glycerol | 12.00 | 12.00 | 7.00 | 7.00 | 12.00 | 12.00 | 12.00 | 12.00 | 12.00 | 12.00 |
| Trimethylolpropane | | | | | | | | | | |
| Polyoxyethylene cetyl ether | | 0.50 | | | | | | | | |
| Polyoxyethylene nonylphenyl ether | | | | | | | | | | |
| Pluronic F68 | | | | | | | | | | |
| Acetylenol E100 | 0.50 | | | | | | | | | |
| Sodium dodecylbenzene sulfonate | | | | | | | | | | 0.50 |
| Polyethylene glycol 600 | | | | | 2.50 | | | | | |
| Polyethylene glycol 1,000 | | 2.50 | | | | 2.50 | | | | |
| Polyethylene glycol 2,000 | | | | | | | 2.50 | | | |
| Polyethylene glycol 400 | | | | | | | | 2.50 | | |
| Polyethylene glycol 4,000 | | | | | | | | | 2.50 | |
| Ethyleneurea | | | | | | | | | | |
| N,N'-dimethylimidazolidinone | | | | | | | | | | |
| Urea | | | | | | | | | | |
| 2-Pyrrolidone | | | | | | | | | | |
| 1,6-Hexanediol | | | | | | | | | | |
| 3-Methyl-1,5-pentanediol | | | | | | | | | | |
| 2-Methyl-1,5-pentanediol | | | | | | | | | | |
| 1,2-Hexanediol | 1.00 | 1.00 | 1.00 | 1.00 | 1.00 | 1.00 | 1.00 | 1.00 | 1.00 | 1.00 |
| 1,4-Butanediol | | | 9.00 | | | | | | | |
| 1,5-Pentanediol | | | | 9.00 | | | | | | |
| 1,7-Heptanediol | | | | | | | | | | |
| 1,2,6-Hexanetriol | | | | | | | | | | |
| Ion-exchanged water | 46.50 | 44.00 | 43.00 | 43.00 | 44.50 | 44.50 | 44.50 | 44.50 | 44.50 | 46.50 |
| Content of component (A) [%] | 0.50 | 0.50 | 0.00 | 0.00 | 0.00 | 0.00 | 0.00 | 0.00 | 0.00 | 0.00 |
| Content of component (B) [%] | 0.00 | 2.50 | 0.00 | 0.00 | 2.50 | 2.50 | 2.50 | 0.00 | 0.00 | 0.00 |
| (A)/(B) | — | 0.20 | — | — | 0.00 | 0.00 | 0.00 | — | — | — |

TABLE 3

Composition of first ink (Compositions shown in %)

| | BK1 ink | | | | | | | | | |
|---|---|---|---|---|---|---|---|---|---|---|
| | 21 | 22 | 23 | 24 | 25 | 26 | 27 | 28 | 29 | 30 |
| Pigment dispersion A | 40.00 | 40.00 | 40.00 | 40.00 | 40.00 | 40.00 | 40.00 | 40.00 | 40.00 | 40.00 |
| Pigment dispersion B | | | | | | | | | | |
| Polymer aqueous solution C | | | | | | | | | | |
| Glycerol | 10.00 | 10.00 | 12.00 | 12.00 | 10.00 | 10.00 | 7.00 | 7.00 | 12.00 | 12.00 |
| Trimethylolpropane | | | | | | | | | | |
| Polyoxyethylene cetyl ether | 0.05 | 0.05 | 1.50 | 1.25 | | | | | | |
| Polyoxyethylene nonylphenyl ether | | | | | | | | | | |
| Pluronic F68 | | | | | | | | | | |
| Acetylenol E100 | | | | | | | | | 1.50 | 1.50 |
| Sodium dodecylbenzene sulfonate | | | | | | | | | | |
| Polyethylene glycol 600 | | | | | | | | | | |
| Polyethylene glycol 1,000 | | | 2.50 | 2.50 | | | | | | |
| Polyethylene glycol 2,000 | | | | | | | | | | |
| Polyethylene glycol 400 | | | | | | | | | | |
| Polyethylene glycol 4,000 | | | | | | | | | | |
| Ethyleneurea | | | | | | | | | | |
| N,N'-dimethylimidazolidinone | | | | | | | | | | |
| Urea | | | | | 7.00 | | | | | 2.00 |
| 2-Pyrrolidone | | | | | | 7.00 | | | 1.00 | 1.00 |
| 1,6-Hexanediol | 12.00 | 10.00 | | | | | | | | |
| 3-Methyl-1,5-pentanediol | | | | | | | | | | |
| 2-Methyl-1,5-pentanediol | | | | | | | | | | |
| 1,2-Hexanediol | 1.00 | 1.00 | 1.00 | 1.00 | 1.00 | 1.00 | 1.00 | 1.00 | 1.00 | 1.00 |
| 1,4-Butanediol | | | | | | | | | | |
| 1,5-Pentanediol | | | | | | | | | | |

TABLE 3-continued

Composition of first ink (Compositions shown in %)

| | BK1 ink | | | | | | | | | |
|---|---|---|---|---|---|---|---|---|---|---|
| | 21 | 22 | 23 | 24 | 25 | 26 | 27 | 28 | 29 | 30 |
| 1,7-Heptanediol | | | | | | | 9.00 | | | |
| 1,2,6-Hexanetriol | | | | | | | | 9.00 | | |
| Ion-exchanged water | 36.95 | 38.95 | 43.00 | 43.25 | 42.00 | 42.00 | 43.00 | 43.00 | 44.50 | 42.50 |
| Content of component (A) [%] | 0.05 | 0.05 | 1.50 | 1.25 | 0.00 | 0.00 | 0.00 | 0.00 | 1.50 | 1.50 |
| Content of component (B) [%] | 12.00 | 10.00 | 2.50 | 2.50 | 0.00 | 0.00 | 0.00 | 0.00 | 0.00 | 0.00 |
| (A)/(B) | 0.004 | 0.005 | 0.60 | 0.50 | — | — | — | — | — | — |

TABLE 4

Composition of second ink

| | (Compositions shown in %) BK2 ink |
|---|---|
| Pigment dispersion B | 40.00 |
| Polymer aqueous solution C | 25.00 |
| Glycerol | 10.00 |
| Diethylene glycol | 5.00 |
| Acetylenol E100 | 1.00 |
| Polyethylene glycol 1,000 | 2.00 |
| Ion-exchanged water | 17.00 |

Evaluation

Comparative Example

The two inks BK1-1 and BK2 were combined to form an ink set. Using the ink set, the following recording durability test was performed on PPC paper Office Planner (manufactured by Canon Inc.) using the following recording apparatus. As the recording apparatus, an ink jet recording apparatus PIXUS PRO9000 (manufactured by Canon Inc.) having an On-Demand type recording head (in which ink is ejected by applying thermal energy according to recording signals) was used. The ink BK1-1 was placed at the green position of the apparatus, and the ink BK2 was placed at the red position. The recording durability was evaluated as follows. (Note that when the inks are placed at the positions described above, the ink BK1-1 and the ink BK2 share the same suction cap.)

<Evaluation>

(Recording Durability)

[Evaluation of a Deflection Phenomenon]

Each of the ink BK1-1 and the ink BK2 constituting the ink set of the Comparative Example was placed at the predetermined position of the ink jet recording apparatus PIXUS PRO9000, and then the suction recovery operation was performed once. The nozzle check pattern of the PIXUS PRO9000 then was recorded, and the resulting nozzle check pattern was visually checked. The occurrence of the deflection phenomenon was evaluated according to the evaluation criteria for the deflection phenomenon described below.

In this stage, when the evaluation result of the deflection phenomenon was ranked A, using the ink set, a solid image was recorded onto the recording medium described above, with a recording density of 1,200 dpi·1,200 dpi and at a recording duty of 15%. The recording was continuously performed in the default mode on 10 sheets. After the completion of recording, the nozzle check pattern of the PIXUS PRO9000 was recorded, and the deflection phenomenon was evaluated according to the criteria below. When the evaluation result of the deflection phenomenon was ranked A again, using the ink set, the image was continuously recorded on 90 sheets of the recording medium. After the completion of recording, the nozzle check pattern of the PIXUS PRO9000 was recorded, and the deflection phenomenon was evaluated again according to the evaluation criteria.

(Evaluation Criteria of Deflection Phenomenon)

A: Check pattern is not disturbed and can be normally recorded.

B: Check pattern is slightly disturbed.

When the evaluation result was ranked A again, using the ink set, the image was continuously recorded on 100 sheets again in the same manner as described above. After the completion of recording, the nozzle check pattern of the PIXUS PRO9000 was recorded, and the deflection phenomenon was evaluated according to the evaluation criteria. Recording was repeated for each 100 sheets and evaluation was performed in the same manner as described above until the evaluation result according to the evaluation criteria was ranked B. At the point when the evaluation result of the deflection phenomenon was ranked B, the test was completed. When the evaluation result of the deflection phenomenon was ranked A even after recording was performed on 10,000 sheets, the evaluation result was ranked A at 10,000 sheets.

[Evaluation of the State in the Periphery of Ejection Orifice]

The recording head used in the evaluation of the deflection phenomenon was detached from the ink jet each Example. The inks BK1-1 to BK1-30 prepared as the first ink and the ink BK2 prepared as the second ink were combined as shown in Table 5 below. The recording durability was evaluated in the same manner as in the Comparative Example, except that the first ink (ink BK1-1 to BK1-30) was placed at the green position of the PIXUS PRO9000 (manufactured by Canon Inc.), and the second ink (ink BK2) was placed at the cyan position. Note that when the inks are placed at the positions described above, the ink ejection portions for the first ink and the second ink use different suction caps.

Table 5 below summarizes the evaluation results of the Comparative Example and Examples 1 through 30.

TABLE 5

| Ink combinations and evaluation results | | | | | | |
|---|---|---|---|---|---|---|
| | | First ink | Second ink | Caps for first ink and second ink | Number of sheets on which image is formed (*1) | State in the periphery of ejection orifice |
| Comparative Example | | BK1-1 | BK-2 | Same | B at less than 10 | C |
| Example | 1 | BK1-1 | BK-2 | Separate | B at 2,000 | B |
| | 2 | BK1-2 | BK-2 | Separate | B at 5,000 | A |
| | 3 | BK1-3 | BK-2 | Separate | B at 7,000 | A |
| | 4 | BK1-4 | BK-2 | Separate | B at 5,000 | A |
| | 5 | BK1-5 | BK-2 | Separate | B at 5,000 | A |
| | 6 | BK1-6 | BK-2 | Separate | B at 5,000 | A |
| | 7 | BK1-7 | BK-2 | Separate | B at 5,000 | A |
| | 8 | BK1-8 | BK-2 | Separate | B at 5,000 | A |
| | 9 | BK1-9 | BK-2 | Separate | B at 7,000 | A |
| | 10 | BK1-10 | BK-2 | Separate | B at 7,000 | A |
| | 11 | BK1-11 | BK-2 | Separate | B at 7,000 | A |
| | 12 | BK1-12 | BK-2 | Separate | A at 10,000 | A |
| | 13 | BK1-13 | BK-2 | Separate | B at 2,000 | B |
| | 14 | BK1-14 | BK-2 | Separate | B at 2,000 | B |
| | 15 | BK1-15 | BK-2 | Separate | B at 5,000 | A |
| | 16 | BK1-16 | BK-2 | Separate | B at 5,000 | A |
| | 17 | BK1-17 | BK-2 | Separate | B at 5,000 | A |
| | 18 | BK1-18 | BK-2 | Separate | B at 2,000 | B |
| | 19 | BK1-19 | BK-2 | Separate | B at 2,000 | B |
| | 20 | BK1-20 | BK-2 | Separate | B at 6,000 | B |
| | 21 | BK1-21 | BK-2 | Separate | B at 8,000 | A |
| | 22 | BK1-22 | BK-2 | Separate | A at 10,000 | A |
| | 23 | BK1-23 | BK-2 | Separate | B at 8,000 | A |
| | 24 | BK1-24 | BK-2 | Separate | A at 10,000 | A |
| | 25 | BK1-25 | BK-2 | Separate | B at 2,000 | B |
| | 26 | BK1-26 | BK-2 | Separate | B at 2,000 | B |
| | 27 | BK1-27 | BK-2 | Separate | B at 2,000 | B |
| | 28 | BK1-28 | BK-2 | Separate | B at 2,000 | B |
| | 29 | BK1-29 | BK-2 | Separate | B at 7,000 | A |
| | 30 | BK1-30 | BK-2 | Separate | B at 7,000 | A |

(*1) This column shows the number of sheets onto which an image could be formed until the evaluation results of the deflection phenomenon ranked B or the evaluation of an image on the 10,000th sheet.

As is evident from Table 5, in the combination of the first ink and the second ink of Example 1 in which separate suction caps were used for the first ink and the second ink, the evaluation of the deflection phenomenon was not ranked B until the 1,000th sheet was printed. At that point, the state of the ejection orifice was ranked B, showing a great improvement in performance compared with Comparative Example. In Examples 2 through 12, 15 through 17, 21 through 24, 29, and 30, in which the first ink contained the component (A) and/or the component (B), the evaluation of the deflection phenomenon was ranked A even at the 2,500th sheet, showing better performance. Furthermore, in Examples 12 and 21 through 24 in which the first ink contained both the component (A) and the component (B), excellent performance was shown. In Examples 12, 22, and 24, particularly exceptional performance was shown.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-136484 filed May 23, 2007, which is hereby incorporated by reference herein in its entirety.

What is claimed is:

1. An ink jet recording apparatus comprising:

a plurality of inks; and a unit configured to perform a recovery operation by suction of inks from a plurality of ink ejection portions using suction caps, wherein the plurality of inks constitute an ink set including a combination of at least a first ink and a second ink, the first ink containing (i) a self-dispersion pigment having at least one hydrophilic group directly or through another atomic group bonded to the surface of the pigment, and (ii) ammonium ions, the second ink containing (i) a pigment, (ii) a polymer having an acid value of 160 mg KOH/g or less, and (iii) alkali metal ions, wherein the suction caps used in the recovery operation are individually respectively provided for each of the ink ejection portions for the first ink and the second ink so as to prevent a deflection phenomenon caused by precipitation of the polymer in the vicinity of ejection orifices for the first ink, and wherein the ratio of the ammonium ion concentration (mol/L) in the first ink to the alkali metal ion concentration (mol/L) in the second ink is greater than or equal to 0.33.

2. The ink jet recording apparatus according to claim 1, wherein the first ink further contains at least one of (A) a nonionic surfactant and (B) a compound selected from the group consisting of polyethylene glycol with an average molecular weight of 600 to 2,000, α,ω-alkanediol having six carbon atoms, and an imidazolidinone derivative.

3. The ink jet recording apparatus according to claim 2, wherein the nonionic surfactant is a compound selected from the group consisting of a polyoxyethylene monoalkyl ether, a polyoxyethylene alkylphenyl ether, and a block copolymer of polyoxyethylene and polyoxypropylene.

4. The ink jet recording apparatus according to claim 2, wherein the α,ω-alkanediol having six carbon atoms is a compound selected from the group consisting of 1,6-hexanediol, 2-methyl-1,5-pentanediol, and 3-methyl-1,5-pentanediol.

5. The ink jet recording apparatus according to claim 2, wherein the imidazolidinone derivative is selected from ethyleneurea and N,N'-dimethyl imidazolidinone.

6. The ink jet recording apparatus according to claim 2, wherein the first ink contains both the nonionic surfactant (A) and the compound (B).

7. The ink jet recording apparatus according to claim 6, wherein, in the first ink, the ratio of the mass percentage of the nonionic surfactant (A) to the mass percentage of the compound (B), on the basis of the total mass of the ink, is 0.005 to 0.5.

8. The ink jet recording apparatus according to claim 1, wherein the mass ratio of the polymer (percent by mass) to the pigment (percent by mass) in the second ink is 0.50 to 10.0.

9. An ink jet recording method comprising:

a process of ejecting a plurality of inks by an ink jet method to perform recording on a recording medium; and a process of performing a recovery operation by suction of inks from a plurality of ink ejection portions using suction caps, wherein the plurality of inks constitute an ink set including a combination of at least a first ink and a second ink, the first ink containing (i) a self-dispersion pigment having at least one hydrophilic group directly or through another atomic group bonded to the surface of the pigment and (ii) ammonium ions, the second ink containing (i) a pigment, (ii) a polymer having an acid value of 160 mg KOH/g or less, and (iii) alkali metal ions, wherein suction caps are respectively provided for the ejection portions for the first ink and the second ink, wherein the recovery operation is operated by using each of the suction caps respectively provided for the ejection portions for the first ink and the second ink so as to prevent a deflection phenomenon caused by precipitation of the polymer in the vicinity of ejection orifices for the first ink, and wherein the ratio of the ammonium ion concentration (mol/L) in the first ink to the alkali metal ion concentration (mol/L) in the second ink is greater than or equal to 0.33.

* * * * *